United States Patent [19]

Geiser et al.

[11] Patent Number: 4,771,470
[45] Date of Patent: Sep. 13, 1988

[54] NOISE REDUCTION METHOD AND APPARATUS FOR MEDICAL ULTRASOUND

[75] Inventors: Edward A. Geiser, Gainesville, Fla.; Leslie H. Oliver, Wolfville, Canada; Bruce D. Franklin, Hansville, Wash.

[73] Assignee: University of Florida, Gainesville, Fla.

[21] Appl. No.: 797,897

[22] Filed: Nov. 14, 1985

[51] Int. Cl.⁴ .............................................. G06K 9/40
[52] U.S. Cl. ......................................... 382/27; 382/54; 128/661.04; 358/166
[58] Field of Search .......................... 382/22, 27, 54; 358/166, 282; 333/165, 166; 367/43, 45, 901; 128/660

[56] References Cited

U.S. PATENT DOCUMENTS

| | | | |
|---|---|---|---|
| 4,012,951 | 3/1977 | Kessler | 367/7 |
| 4,290,049 | 9/1981 | Sternberg et al. | 382/54 |
| 4,399,461 | 8/1983 | Powell | 382/54 |
| 4,547,811 | 10/1985 | Ochi et al. | 358/282 |
| 4,554,593 | 11/1985 | Fox et al. | 382/54 |
| 4,561,022 | 12/1985 | Bayer | 382/54 |
| 4,613,986 | 9/1986 | Ataman et al. | 382/27 |
| 4,623,923 | 11/1986 | Orbach | 358/166 |

Primary Examiner—Leo H. Boudreau
Assistant Examiner—Donald J. Daley
Attorney, Agent, or Firm—Dennis P. Clarke

[57] ABSTRACT

Ultrasonic images are enhanced by applying to the images asymmetric balanced gradient operators or masks which are formed to produce values which are maximized at the edges of spots having a predetermined size and location relative to the mask, which spots have a high likelihood of being specular targets. The gradient operators are further formed to produce minimum values for smaller spots corresponding to acoustic speckle. In the resultant image, the edges of specular targets are enhanced and acoustic speckle is substantially eliminated. Ultrasonic images may be processed in real time with the gradient operators in either an image processing computer or in a hardware pipeline processor.

22 Claims, No Drawings

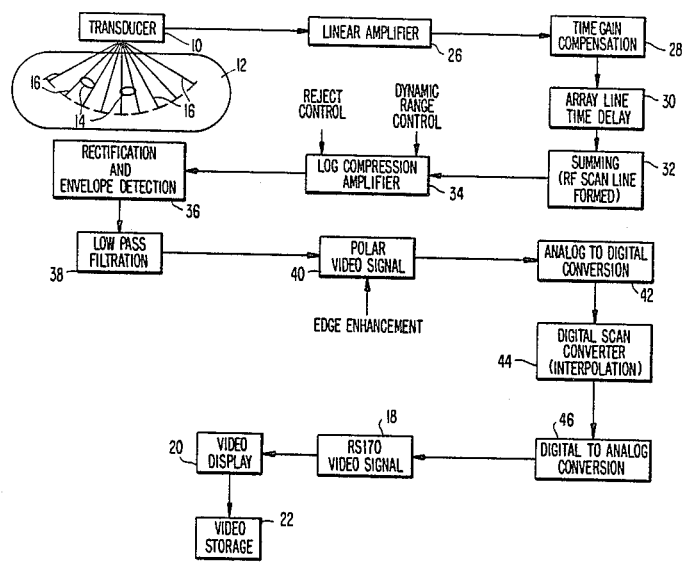

UNENHANCED GREY
LEVEL AMPLITUDES

PREWITT X ENHANCEMENT

LAPLACIAN ENHANCEMENT

FIG. 3A.
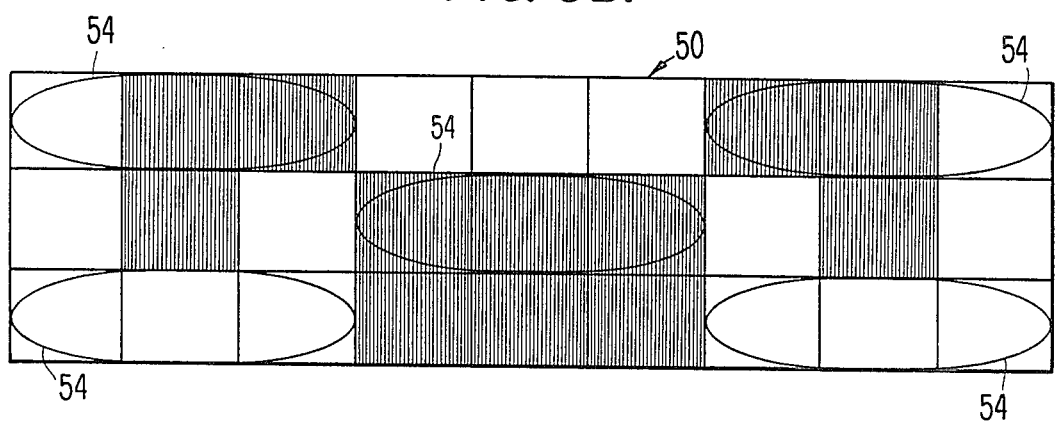
FIG. 3B.
FIG. 3C.
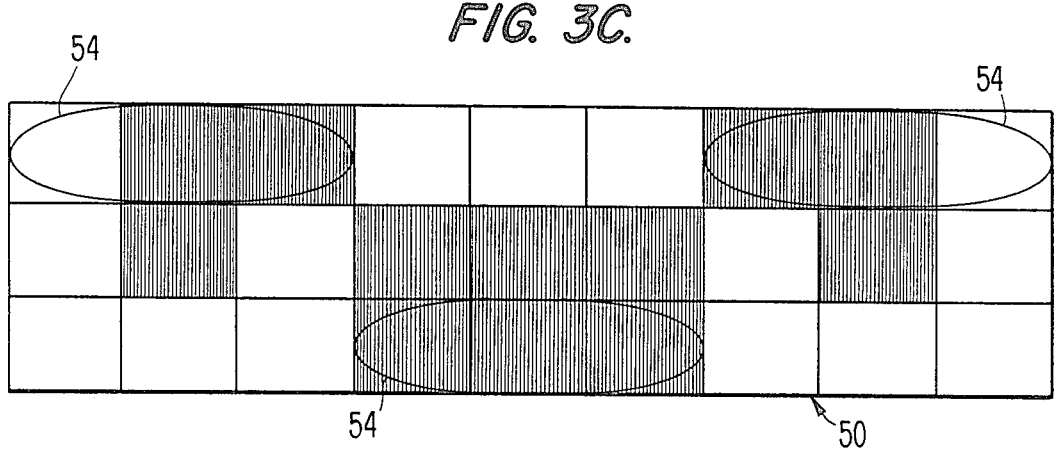

FIG. 4A.

COLUMN

|  | 1 | 2 | 3 | 4 | 5 | 6 | 7 |
|---|---|---|---|---|---|---|---|
| ROW 1 | −1 | −1 |  |  |  | −1 | −1 |
| 2 | −1 |  | +1 | +1 | +1 |  | −1 |
| 3 |  |  | +1 | +1 | +1 |  |  |

FIG. 4B.

| −1 | −1 |  |  |  | −1 | −1 |
|---|---|---|---|---|---|---|
| −1 |  | +1 | +2 | +1 |  | −1 |
|  |  |  | +2 |  |  |  |

FIG. 4C.

| −1 | −1 |  |  |  | −1 | −1 |
|---|---|---|---|---|---|---|
| −1 |  |  | +2 |  |  | −1 |
|  |  | +1 | +2 | +1 |  |  |

FIG. 5A.

COLUMN

|  | 1 | 2 | 3 | 4 | 5 | 6 | 7 |
|---|---|---|---|---|---|---|---|
| ROW 1 | −1 |  |  |  |  |  | −1 |
| 2 | −1 |  | +1 | +1 | +1 |  | −1 |
| 3 |  |  |  | +1 |  |  |  |

| −1 |  |  |  |  |  | −1 |
|---|---|---|---|---|---|---|
| −1 |  |  | +2 |  |  | −1 |
|  |  |  | +2 |  |  |  |

FIG. 5C.

| -1 | | | | | | -1 |
|---|---|---|---|---|---|---|
| -1 | | | +1 | | | -1 |
| | | +1 | +1 | +1 | | |

FIG. 5D.

| -1 | | | | | | -1 |
|---|---|---|---|---|---|---|
| -1 | | | +2 | | | -1 |
| | | +1 | | +1 | | |

FIG. 6A.

COLUMN

| | 1 | 2 | 3 | 4 | 5 | 6 | 7 |
|---|---|---|---|---|---|---|---|
| ROW 1 | -1 | | | | | | -1 |
| 2 | | | | +1 | | | |
| 3 | | | | +1 | | | |

FIG. 6B.

| -1 | | | | | | -1 |
|---|---|---|---|---|---|---|
| | | | | | | |
| | | | +2 | | | |

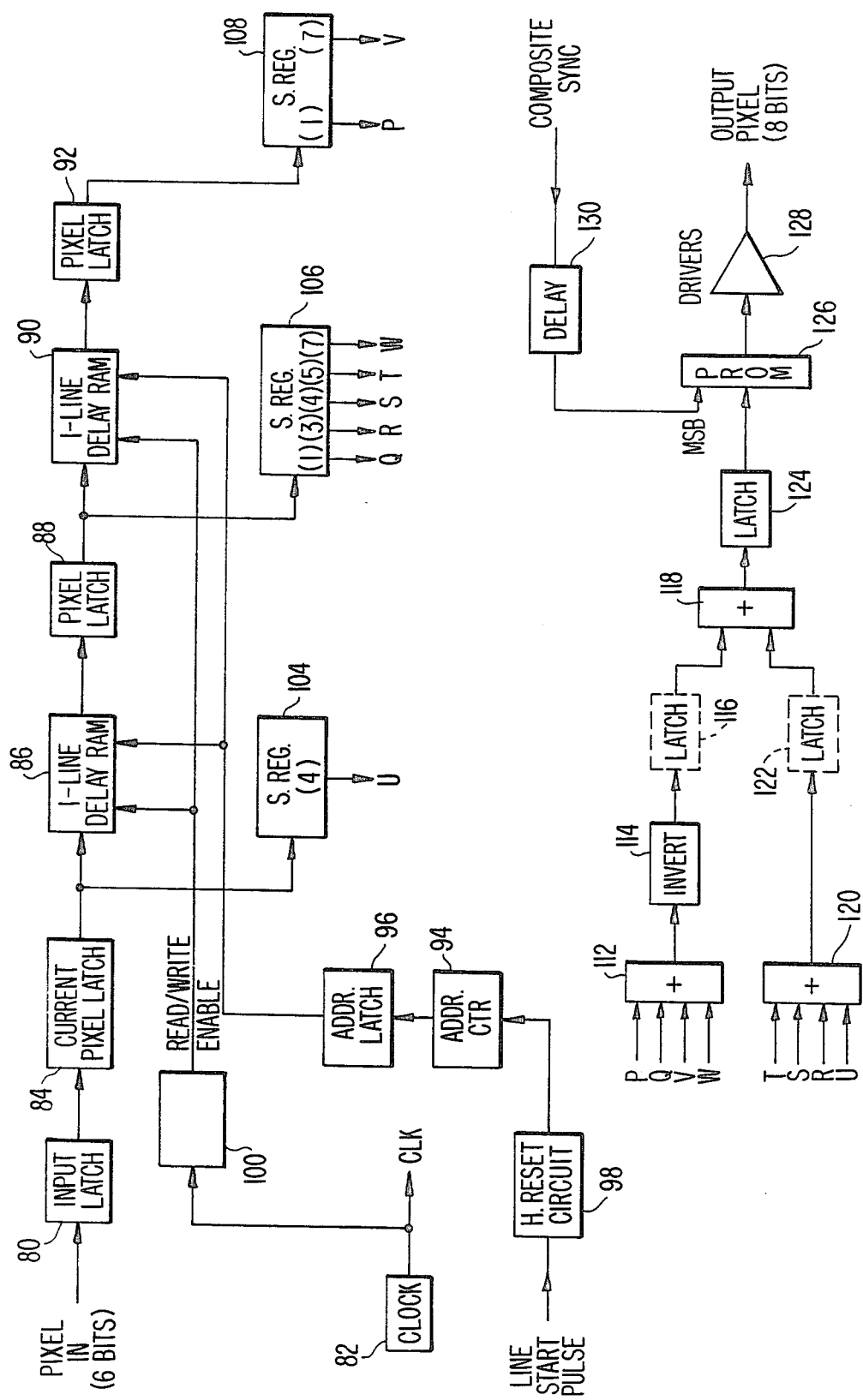

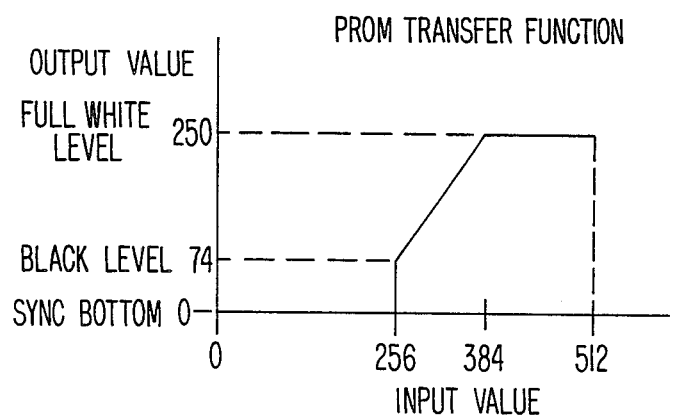

NOISE REDUCTION METHOD AND APPARATUS FOR MEDICAL ULTRASOUND

BACKGROUND OF THE INVENTION

This invention relates generally to ultrasonic imaging systems for diagnostic use or non-destructive testing, and more particularly to the real-time reduction of noise in such systems.

Ultrasonic imaging is being increasingly used in the medical community as a diagnostic technique for providing visual representations of tissue interfaces in a living subject. It is particularly useful for imaging organs which tend to shift or move, such as the heart. Echocardiographic images enable a physician to study the heart of a living patent non-invasively and to obtain important information about its condition.

The usefulness of medical ultrasound as a diagnostic technique, however, has been limited to some extent by the very poor signal-to-noise ratio in the resulting images. When ultrasound is injected in the body and encounters tissue, one of two interactions occurs. The first is reflection from a specular (mirror-like) target which has surfaces that are large, planar, and have minor irregularities that are small in comparison to the wavelength of the untrasound being used. In the specular case, the usual laws of reflection and refraction occur at the interface, and the ultrasound waves reflected back to the transducer are in phase. However, even the images of large specular targets, such as the aorta, may have gaps at times. This is due to the waves being reflected from two different levels in the structure, either because of layers in the structure or because of its curvature, and the waves arriving at the transducer out of phase and cancelling. This produces a hole or "dropout" in the image.

The second interaction involves an encounter of the ultrasonic waves with small discrete targets, such as cellular structure, which are smaller than one-half wavelength of the ultrasonic wave. When coherent waves encounter the small targets, which are referred to as Rayleigh scatterers, the ultrasonic waves are scattered or dispersed in all directions. The spherical wavefronts arriving at the transducer from the individual scatterers may add or cancel at any particular time, thereby producing a very fine textured salt-and-pepper interference pattern which is superimposed on the image. This pattern, which is commonly referred to as acoustic speckle, constitutes noise which may have an intensity equal to or higher than the signal of interest. Acoustic speckle is present to some degree at every point in the ultrasonic image. Accordingly, the grey scale level at a point in the image is not necessarily a true representation of the reflected amplitude from a corresponding position in the sample volume. Acoustic speckle blurs the edges of specular targets and impairs the resolution of the resulting image. Because of acoustic speckle and dropouts caused by phase cancellation from specular targets, as described above, the ultrasonic image displayed is not a true representation of the structures in the two-dimensional echo beam.

Although various techniques are known for reducing speckle in images, known techniques have not proved to be satisfactory. One technique which is commonly employed in ultrasonic imaging systems is low pass filtration. Since speckle has a fine texture, and accordingly a high spatial frequency content, this technique may achieve some reduction in speckle. However, the average speckle size is roughly equal to the resolution cell of the ultrasonic imaging system, and low pass filtering causes degradation in resolution. Another technique which has been used for reducing speckle in ultrasonic as well as other types of imaging systems is to process the image using gradient operators or masks to enhance edges in the image. Gradient operators perform a discrete differentiation at each pixel in the image looking for the rate of change in grey level in order to provide a peak intensity in the image at the maximum slope of the rising grey level. Although such image processing techniques do enhance the image to some extent, they do not produce the desired enhancement of selective structures of interest, i.e., the specular reflecting surfaces. Moreover, the processing required to use some gradient operators is difficult to perform in real time and adds a significant amount of complexity and expense to the system.

It is desirable to provide methods and apparatus which operate in real time to reduce noise and afford image enhancement of selective structures and that avoid the foregoing and other disadvantages of known image enhancement techniques, and it is to this end that the present invention is directed.

SUMMARY OF THE INVENTION

In one aspect, the invention affords a method of processing image data to reduce noise and enhance selected portions of an image which is formed from a plurality of pixels arranged in a spatial array, the data representing an intensity level in each pixel, which comprises weighting the data representative of preselected pixels of an asymmetric portion of the spatial array of pixels with predetermined coefficient values. The preselected pixels and the coefficient values are selected to enhance the leading edges of spots in the image which have a size greater than a predetermined size and which have a predetermined location in the asymmetric portion. This process is repeated for a plurality of asymmetric portions of the image, and a second array of pixels corresponding to a transformed image is formed by employing the transformed intensity values as the values of the pixels of the second array which correspond to the central pixels of the plurality of asymmetric portions. The transformed image is then displayed.

In another respect, the invention involves applying to data representative of preselected pixels of an asymmetric array of pixels a gradient operator, the gradient operator having a plurality of elements, each of which corresponds to a pixel of the asymmetric array and the elements corresponding to said preselected pixels having predetermined coefficient values. A weighted sum of the product of the coefficient values and the corresponding intensity values of the preselected pixels is formed to produce a new intensity value representative of the change in intensity between certain pixels in a predetermined location in the asymmetric array. This process is repeated for a plurality of asymmetric arrays, a second spatial array of pixels is formed using the new intensity values, and the second array is displayed as a transformed image.

In another aspect, the invention affords an apparatus for processing image data to reduce noise and enhance selected portions of the image, the image being formed by a plurality of pixels arranged in a plurality of lines and the data being representative of the intensity level in a pixel, comprising means for receiving data corresponding to successive pixels along a line; first delay means connected to the receiving means for delaying the data by an interval corresponding to one line; second delay means for delaying the data from the first delay means by another interval corresponding to a line; third delay means for delaying the data from the receiving means by a first predetermined set of pixel intervals to produce a first set of delayed pixels; fourth delay means for delaying the data from the first delay means by a second predetermined set of pixel intervals to produce a second set of delayed pixels; fifth means for delaying the data from the second delay means by a third predetermined set of pixel intervals to provide a third set of delayed pixels; means for combining the first, second, and third sets of delayed pixels to produce a new intensity value; and means responsive to the combining means for forming a new line of pixels having values corresponding to successive new intensity values.

BRIEF DESCRIPTION OF THE DRAWINGS

FIGS. 3A-C illustrate the general form of an image enhancement mask in accordance with the invention and the relative sizes of specular targets and acoustic speckle;

FIGS. 4A-C illustrate different embodiments of masks in accordance with the invention which employ three negative coefficients in each of the anterior corners;

FIGS. 5A-D illustrate different embodiments of masks in accordance with the invention which employ two negative coefficients in the anterior corners;

FIGS. 6A-B illustrate different embodiments of masks in accordance with the invention which employ a single negative coefficient in the anterior corners;

FIG. 8 is a block diagram of an image enhancement pipeline processor in accordance with the invention;

FIG. 9 is a chart illustrating the pixel delays afforded by the processor of FIG. 8; and FIG. 10 illustrates a PROM transfer function of the processor of FIG. 8.

DESCRIPTION OF THE PREFERRED EMBODIMENTS

The invention is particularly well adapted for providing noise reduction and image enhancement in medical ultrasonic images and will be described in that environment. However, as will become apparent from the description which follows, this is illustrative of only one utility of the invention.

Figure 1:
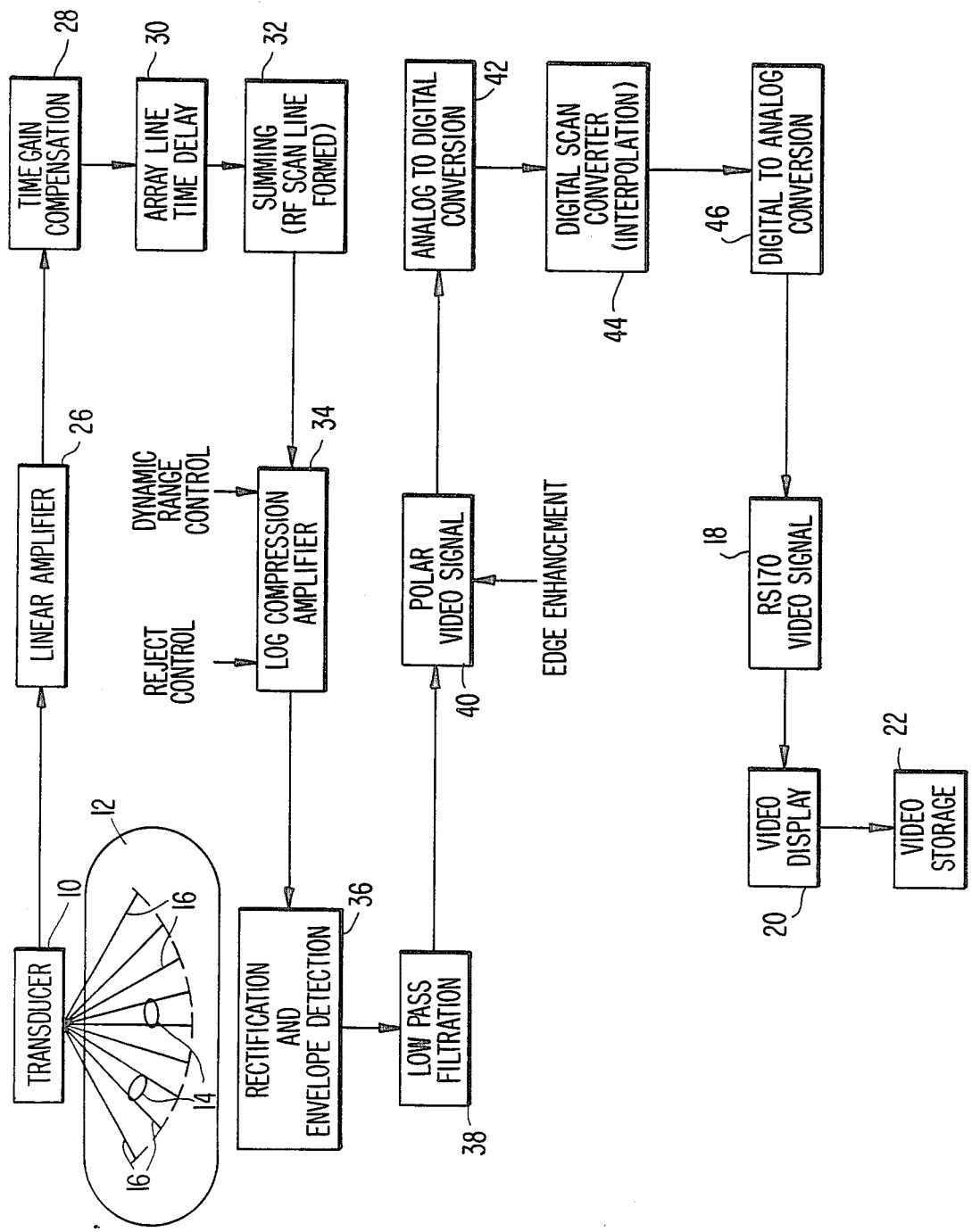
FIG. 1 is a block diagram of a typical ultrasonic imaging system.

FIG. 1 is a functional block diagram of a conventional ultrasonic imaging system. The system employs a transducer 10, such as a piezoelectric crystal, which produces sound waves when activated by an electric field and produces electrical impulses when impacted by a sound wave. The system operates in a manner similar to RADAR or SONAR systems. The transducer transmits ultrasonic energy into a sample volume 12, such as the human body, which is being studied and receives reflected echos from targets 14 within the sample volume. The ultrasonic energy reflected by the targets is returned to the transducer along a plurality of radial scan lines 16. Depending upon the equipment, there may be between 120 and 200 polar scan lines, and specular targets may produce echo returns across 4 to 6 lines. The echoes returned to the transducer are converted to electrical signals which represent the angular position and range or distance from the transducer of each target. As will be described, the ultrasonic imaging system processes the returning signals to produce a video signal which is formatted at 18 into either standard RS 170 format or European PAL format for presentation on a video display 20, and, if desired, for storage in a video storage unit 22, such as a video recorder. The video signal intensity modulates the video display to produce a grey scale display of light and dark spots representative of the intensity of the reflected echos from corresponding points in the sample volume. The resulting image represents tissue interfaces in a plane which transversely intersects the body of the subject.

The signals from transducer 10 are amplified at 26, applied to a time gain compensation circuit 28, to an array line time delay 30, and to a summing circuit 32 which forms RF scan lines. These scan lines are applied to a log compression amplifier 34 which reduces their dynamic range. The amplified signal is rectified and detected at 36 and low pass filtered at 38 to provide an output video signal which corresponds to a polar representation of the tissue interfaces in a transverse plane through the sample volume. Edge enhancement of the signal may be applied at 40, as will be described shortly. The signal is then converted to digital form in an analog-to-digital converter 42, and applied to a digital scan converter 44 which performs an interpolation and converts the polar representation of the image to a rectangular x-y format in which the targets are represented as bright spots along horizontal scan lines. The signal is then reconverted to analog form in a digital-to-analog converter 46 and applied to the RS 170 video signal formater for display on the video display.

As noted earlier, conventional edge enhancement techniques seek to identify and enhance areas of an image corresponding to the maximum rate of change in grey level intensity of the signal. The edge enhancement applied at 40 to the analog signal may involve differentiating each scan line by applying an analog function to the signal and then reimposing some portion of the resultant back onto the signal. Edge enhancement may also be applied to the signal in digital form, as at either the input or the output of the digital scan converter, which is more convenient for applying an edge enhancement mask to the signal. There are several well known masks or gradient operators which are employed in conventional image processing systems. These gradient operators generally perform a discrete differentiation at each pixel in the image by looking at the intensity values of surrounding pixels to determine the rate of change in grey level intensity. Mathematically, the gradient operator and the portion of the image to which the operator is applied may be considered to be matrices, where the pixel values of the portion of the image to which the operator is applied represent the values of the image matrix. The result of successively applying the mask to the image is equivalent to replacing the value of each pixel in the image with a new value corresponding to the sum of the products of the gradient operator matrix coefficients and the corresponding image matrix pixel values. Gradient operators which are commonly employed for edge enhancement include the Prewitt operator, the Sobel operator, and the LaPlacian operator. In order to facilitate a better understanding of the invention, a brief description will be presented to illustrate the manner in which these operators achieve edge enhancement.

The Prewitt operator may be expressed as follows:

$$P = \left( \left| \begin{matrix} -1 & 0 & 1 \\ -1 & 0 & 1 \\ -1 & 0 & 1 \end{matrix} \right|^2 + \left| \begin{matrix} 1 & 1 & 1 \\ 0 & 0 & 0 \\ -1 & -1 & -1 \end{matrix} \right|^2 \right)^{\frac{1}{2}} \quad (1)$$

The first term of Equation (1) represents a approximation of the partial differential of image in the x direction, and the second term represents a discrete approximation of the partial differential in the y direction.

The Sobel operator is very similar and may be expressed as follows:

$$S = \left( \left| \begin{matrix} -1 & 0 & 1 \\ -2 & 0 & 2 \\ -1 & 0 & 1 \end{matrix} \right|^2 + \left| \begin{matrix} 1 & 2 & 1 \\ 0 & 0 & 0 \\ -1 & -2 & -1 \end{matrix} \right|^2 \right)^{\frac{1}{2}} \quad (2)$$

As with the Prewitt operator, the Sobel operator approximates the partial differential of the image in both the x and y directions. However, with the Sobel operator, the weight of the nearest neighbor to the center element of each term in both the x and y positions assumes a value of 2 rather than 1.

The LaPlacian operator is given by:

$$L = \left| \begin{matrix} -1 & -1 & -1 \\ -1 & 8 & -1 \\ -1 & -1 & -1 \end{matrix} \right| \quad (3)$$

This operator is simplier than either the Prewitt or Sobel operators. The central pixel of the image is multiplied by eight and the surrounding eight pixels are substracted from the total, as indicated. This can be thought of as differentiation in all directions. With all three of these operators, the edges of all targets are enhanced. The operators do not selectively enhance the edges of the target of interest.

To illustrate the manner in which such operators enhance edges, assume that the following array of three rows and ten columns of numbers represents the grey level amplitudes in the pixels of a portion of an ultrasonic image.

| 0 | 0 | 0 | 0 | 5 | 9  | 8 | 7 | 8 | 8 |
|---|---|---|---|---|----|---|---|---|---|
| 0 | 0 | 0 | 1 | 6 | 10 | 8 | 8 | 7 | 8 |
| 0 | 0 | 0 | 1 | 4 | 9  | 9 | 8 | 8 | 8 |

Figure 2A:
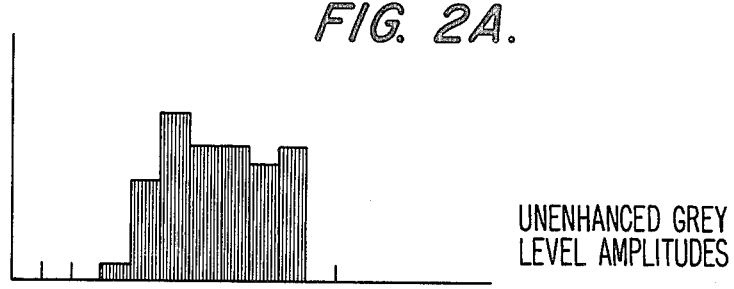
FIGS. 2A-C illustrate the effect of applying conventional gradient operators to image data.

From an inspection of the array of numbers, it can be seen that the amplitude of the grey level goes from numeral zero on the left (columns 1–3) through an edge with a somewhat higher amplitude of 9, 10, and 9, respectively, in column 6, and then to a stable grey level amplitude of 7 and 8 on the right in columns 7–10. The ten amplitudes of the center row (row 2) are plotted in bar graph form in FIG. 2A.

Applying the x term of the Prewitt operator to the array of intensity values, the 3×3 array of intensity values in columns 1–3 and rows 1–3 are multiplied by the corresponding elements of the 3×3 matrix of the left-hand term of Equation (1), the products summed, and the value of the central pixel (column 2, row 2) replaced with the resultant. This operation can be visualized as overlaying the first three columns of intensity values with a mask having coefficients corresponding to the left-hand term of Equation (1), multiplying the corresponding elements of the two matrices together, and taking as the value of the pixel of the enhanced image corresponding to the central element the sum of the products. Since all intensity values in the first three columns are zero, the resultant is zero, and the intensity value of the central pixel (column 2, row 2) of the enhanced image is also zero. Next, the operation is repeated by applying the mask to columns 2–4 of the intensity values. Since all intensity values are zero except those in column 4, rows 1 and 2, the sum of the products is $1+1=2$, and the central pixel value (column 3, row 2) will be replaced with the value 2. By sequentially repeating this operation, stepping one column each time, the transformed grey level amplitudes for the pixels in row 2, columns 2–9 become 0 2 15 26 10 −5 −2 1

Figure 2B:
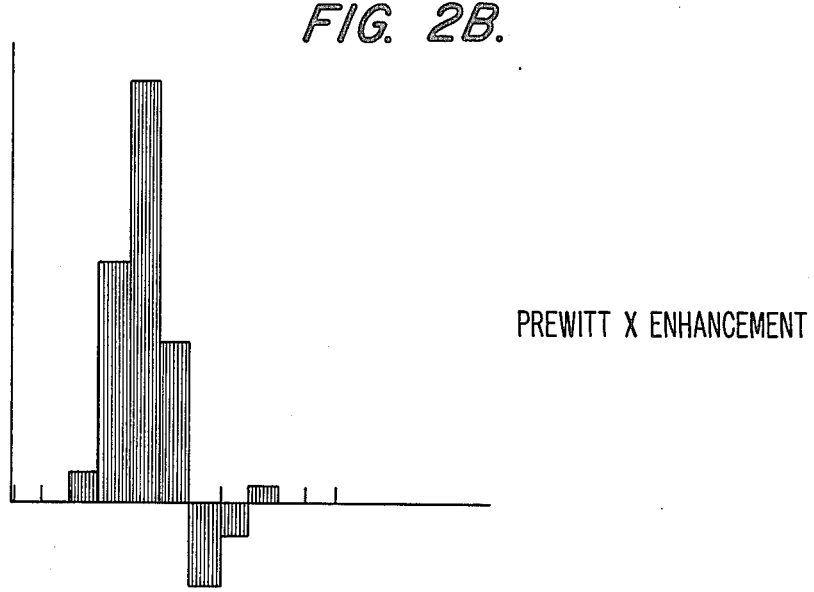

These values are plotted in FIG. 2B. As can be seen, the peak of the Prewitt x component occurs at the maximum slope of the rising grey level, and a negative value is obtained at the later fall off in grey level from 10 to 8. Thus, the edge has been differentiated and enhanced. Similar results would be obtained using the Sobel operator, except that the values would be somewhat different.

Applying the LaPlacian operator to the array of grey level amplitudes, the new intensity values for the eight pixels in row 2, columns 2–9 are

0 −2 −8 9 22 −4 1 −7

Figure 2C:
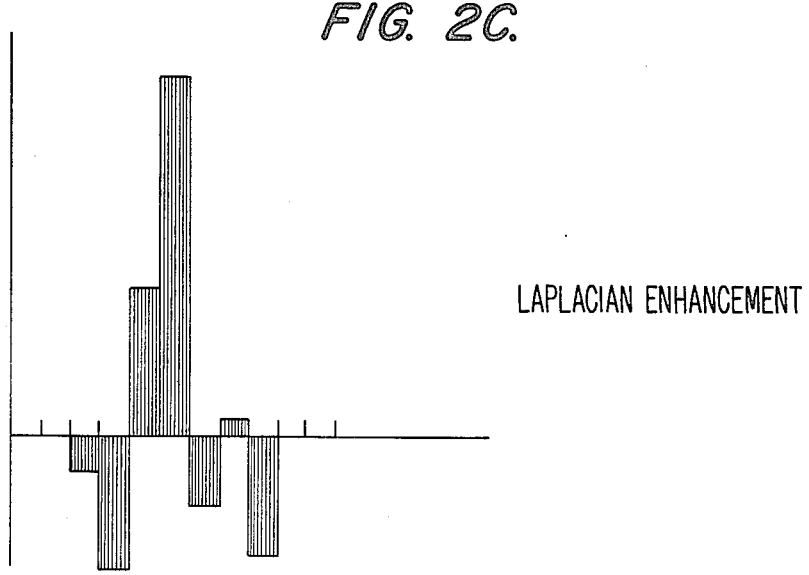

These values are plotted in FIG. 2C. As shown in the figure, the enhanced image reaches a maximum at the peak grey level of the edge. Also, both operators provide an enhanced local maximum at the peak grey level of the edge.

A characteristic of the foregoing as well as other known gradient operators for image enhancement is that the operators are symmetric, e.g., 3×3 matrices. Such operators treat all pixels as equally important and, accordingly, require that the resolution of the image be equal in both the x and y directions. In ultrasonic imaging, however, the resolution cells are not symmetric and all pixels are not equally important. This is due partially to spreading of the polar scan lines with distance from the transducer, and partially due to certain complexities of the transducer which cannot be easily controlled and which limit the ability to determine precisely the point from which a return echo originated. Ultrasonic image pixels should be approximately three times as wide as they are deep. That is, in the x or angular direction, the pixel should be approximately three times that of the y or range direction. Thus, for ultrasonic images, a mask having a size of 3×9 is more appropriate.

The use of 3×9 masks structured similarly to conventional masks for processing acoustic images, however, has a number of disadvantages. First, to implement in real time two 3×9 masks, one in the x direction and one in the y direction in a manner similar to the Prewitt and Sobel operators, and perform the extensive computations required to cover the image in 1/30th of a second (the standard frame rate of a video display) would be difficult and expensive. Also, such masks would enhance the borders of all spots and would not delineate those that are important in the image. It is desirable to remove speckle from the image and leave the larger spots which are more likely to represent specular targets, not simply enhance edges of targets. Also, it has been found that the leading edge of the larger brighter spots is most likely to represent the position of a specular target. Therefore, employing a mask which simply embodies a leading edge gradient operation may enhance specular targets, but it would also enhance the leading edge of small scattering targets, which is undesirable.

In accordance with the invention, it has been found that masks embodying certain characteristics avoid the foregoing disadvantages of conventional masks and afford the desired results. Masks in accordance with the invention enhance specular targets while substantially eliminating acoustic speckle, and require only a small number of computations, thereby enabling them to be easily implemented in real time. Furthermore, only a single mask is required. It is not necessary to employ masks for separate directions, such as the Prewitt and Sobel operators.

FIG. 3A illustrates the general form of a mask 50 in accordance with the invention. As shown, the mask is asymmetric and is based upon a 3×9 matrix, being three times as wide (in the x or angular direction) as it is deep (in the y or range direction). However, not all of the 27 elements of the matrix is used. It has been found that only certain ones of the elements are significant in affording speckle reduction and enhancement of specular targets. These are the 12 elements which are shown shaded in the figure, and of the 12 elements not all need be used. For example, as indicated in the figure, none of the elements in the far left-hand column 0 or in the far right-hand column 8 are used. Thus, the mask effectively has a 3×7 size. It is known that acoustic speckle in an ultrasonic image generally extends over fewer scan lines than does reflection from a specular target. It has been found that the three center elements, i.e., pixels, of rows 2 and 3 (columns 3-5) are important in identifying specular targets and approximate the spot size and resolution cell for a specular target in the image. FIG. 3A illustrates the position of a spot 52 with a high likelihood of being a specular target aligned with these elements. Accordingly, in order to identify specular targets, it is desirable that these central elements in the mask be assigned positive coefficient values, as shown, for example, in FIG. 4A where the elements have been assigned a value of +1. On the other hand, acoustic speckle has a spot size which is smaller and more compact than that of a specular target and is also random. FIGS. 3B and C illustrate acoustic speckle spots 54 at different areas of the mask. In addition, in order to enhance the leading edge of specular targets while eliminating small scattering targets, it has been found that if only the upper right-hand and left-hand elements of rows 1 and 2 (columns 1-2 and 6-7) are assigned negative coefficient values, such as illustrated in FIG. 4A, then the mask will accomplish differentiation with respect to the central elements and produce a maximum only when a spot of approximately 3×1 pixels is centered in the mask. The remaining elements of the mask (those which are not shaded) can only detract from this enhancement and, accordingly, are set to zero. Furthermore, small spots characteristic of acoustic speckle 54, such as illustrated in FIGS. 3B and C, will not maximize the value calculated by the mask, as will be demonstrated shortly, and will be eliminated as noise.

Basically, any balanced operator, i.e., mask, in which one or more of the elements in the lightly shaded areas in the upper left and upper right corners (rows 1-2, columns 1-2 and 6-7) have negative coefficient values, and one or more of the central darkly shaded elements (rows 2-3, columns 3-5) have positive coefficient values will accomplish some degree of speckle removal and enhancement of specular targets. FIGS. 4A-C, 5A-D, and 6A-B illustrate different embodiments of masks in accordance with the invention which have been found effective to reduce speckle and enhance specular targets. The masks of FIGS. 4A-C employ three negative coefficients in the anterior corners; the masks of FIGS. 5A-D employ two negative coefficients in the anterior corners; and the masks of FIGS. 6A-B employ one negative coefficient in the anterior corners. All masks are balanced with respect to the center column (column 4) in the sense that the elements of the mask which are used are symmetrically distributed with respect to the center column, and the sum of the coefficient values of the elements in each half of the mask on opposite sides of the center column is the same. The masks do not actually sort out and save specular targets, but instead calculate a simultaneous biangular gradient value that is maximized when spots of optimal size, i.e., specular targets, are aligned in the masks. Masks which employ coefficients of plus or minus 1 are the most convenient to implement since they do not require multiplication operations. The three masks which have been found to be most useful are those illustrated in FIGS. 5A and 5C and FIG. 6A, with the mask of FIG. 5A being found to work best.

Figure 7:
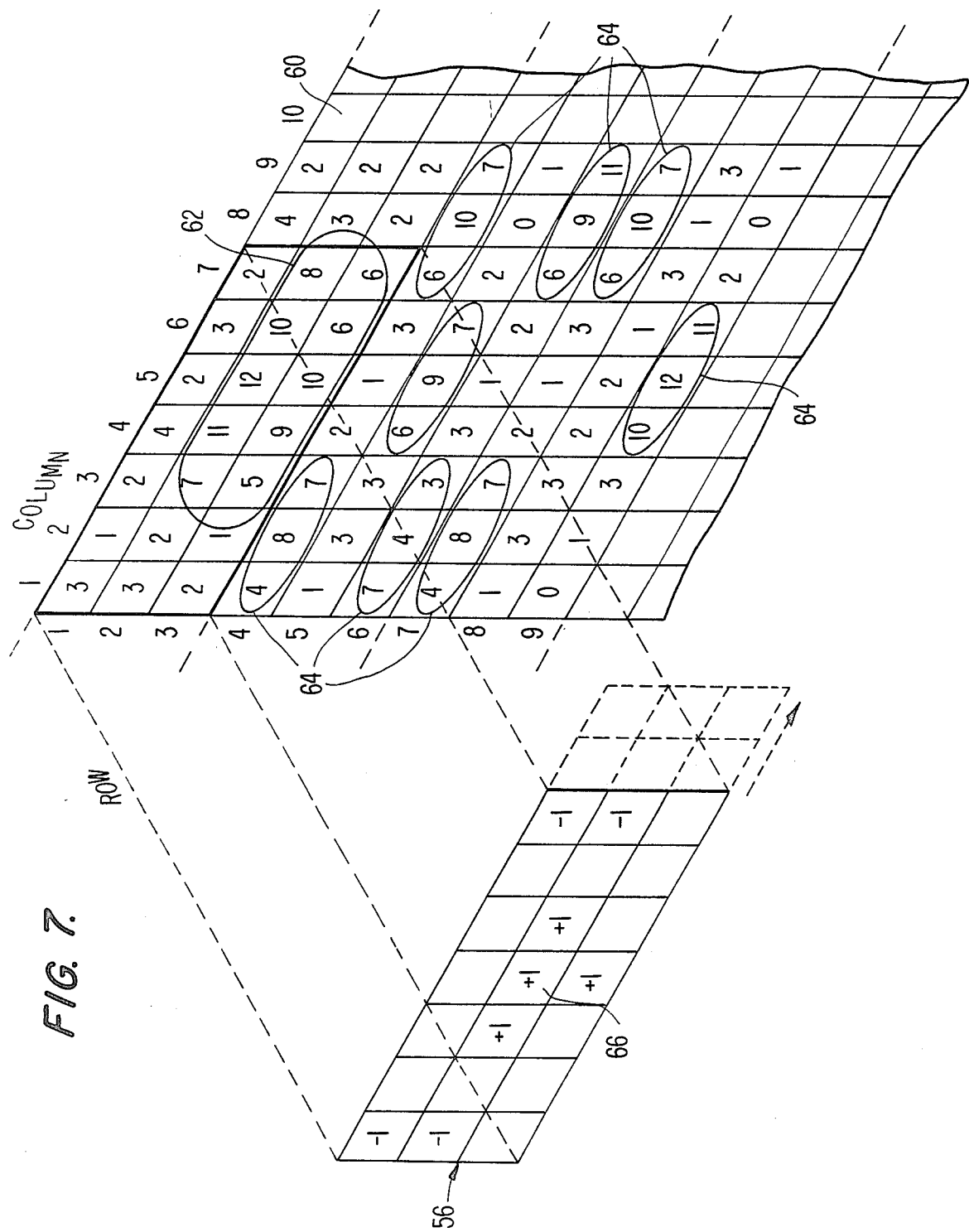
FIG. 7 is a diagrammatic perspective view which illustrates the manner in which the mask of FIG. 4A is applied to raw image data.

FIG. 7 illustrates conceptually the manner in which the masks are applied to an ultrasonic image, the mask 56 of FIG. 5A being used as an example. Referring to FIG. 7, a portion of an image 60 is illustrated diagramatically as a plurality of horizontal rows and vertical columns of pixels, each being represented as a block. Each row may correspond to a horizontal scan line of the video display, and the numbers within each block represent the grey level intensity of the corresponding pixel along the scan line. For purposes of illustration, it is assumed that the image contains a spot 62 corresponding to a specular target at the position illustrated in rows 2 and 3, columns 3-7, and contains spots 64 representing acoustic speckle in rows 4-9 in the same relative positions shown in FIGS. 3B-C, rows 4-6 corresponding to FIG. 3B and rows 7-9 corresponding to FIG. 3C.

Applying mask 56 to the image is equivalent to overlaying the image with the mask with the elements of the mask aligned with the pixels, multiplying the intensity values of the pixels by the coefficients of the masks, summing the products, and replacing the intensity value in the pixel of the image corresponding to the central element 66 of the mask with the resultant of the sum. The mask is then indexed one column, i.e., one pixel, to the right, as indicated in phantom lines. The process is repeated, and the value of the next pixel along the row is replaced with the results of the operation. The process is continued repeatedly to the end of the line. The mask is then returned to the left of the image, indexed downwardly one row, and the process repeated for the next line. This operation is continued until the entire image has been covered by the mask. Starting at the upper left-hand corner of the image and applying the mask as illustrated in FIG. 7, the results of the first three operations are as follows:

$$7+11+12+9-3-3-2-8=23$$

$$11+12+10+10-1-2-4-3=33$$

$$12+10+8+6-2-7-2-2=23$$

In applying the masks, if the value calculated for the central pixel is less than zero, the value is set to zero. Values above zero may be scaled to the grey level display utilized with the maximum value corresponding to the maximum brightness. For example, for sixteen levels of grey (corresponding to a four-bit digital word), the maximum value obtained from the entire image may be set to a level of 16 in the transformed display, and other values may be scaled accordingly.

Applying the mask to the acoustic speckle in rows 4–6 produces, for the first three indexes to the right, central pixel values of 8, 2, and 2, respectively. Thus, these spots would be set to very low levels in comparison to the maximum value of 33 calculated above. In a similar manner, applying the mask to rows 7–9, produces values of 3, −5, and −3. Indexing the mask downwardly one additional row produces values of 19, 28, and 15 for the spot 64 in row 9, which is consistent with the fact that some specular targets can be displayed as very bright, but small spots. On the other hand, passing the mask through a region of uniform high brightness extending over all elements of the mask, the central pixel values would all be calculated to be zero. Thus, homogeneous regions of high intensity will also be removed from the resultant image. However, the borders or edges of the specular targets will remain intact and will be enhanced. In effect, applying the mask to the image is equivalent to forming a new image, the pixel values of which are the weighted sums of preselected ones of the pixel values of the original image. The weighting is determined by the coefficient values of the mask, and the pixels of the original image which are combined are selected to enhance the edges of spots of a predetermined size.

In the foregoing example, the image has been assumed to be in rectangular format, such as is available at the output of digital scan converter 44 of FIG. 1, for presentation on the video display. As previously noted, converter 44 performs an interpolation to convert the polar matrix image at the output of the analog-to-digital converter 42 into rectangular format by deleting pieces of information and interpolating so that the regions between the lines of sight in the far field are filled in and more pleasing. As a result, there are some inaccuracies in the raw image data at the output of the digital scan converter. While applying the mask to the rectangular image at the output of converter 44 works well, better accuracy may be obtained by applying the mask to the polar matrix image prior to being converted into rectangular format. In the polar image, specular targets are represented as spots across four to six polar scan lines. Thus, the 3×7 mask operator applied to the polar image would operate quite efficiently and, in fact, a 3×5 mask may also be sufficient. From the foregoing examples, it can be seen that the size of the mask is important in terms of the size of the spots which will be enhanced. The 3×7 mask applied to images in rectangular format matches well the spot sizes in television images or scan converted images digitized at 256×256 pixels. If the image were converted at 512×512 pixels, the mask would have to be twice as large in order to maintain the same geometry with respect to a spot. As will also be apparent from the foregoing, masks in accordance with the invention are not arbitrary, but are gradient sensitive and size sensitive by virtue of their simultaneous angular (approximately 45°) differentiations, and the positions of the negative and the positive coefficients are important in the ability of the mask to remove the finer more compact back scatter from the image. Also, the particular positions, i.e., elements, of the masks which are used have been found to be important for the theoretically optimum 3×9 pixel region.

The invention may be implemented either in software in an image processing computer, or in hardware in a pipeline type processor. FIG. 8 illustrates a hardware implementation of a real time image enhancement pipeline processor in accordance with the invention. The processor of FIG. 8 may be inserted into the conventional ultrasonic imaging system of FIG. 1 either prior to or following the digital scan converter 44, or between the ditigal-to-analog converter 46 and the RS 170 video signal formatter (with the addition of analog-to-digital and digital-to-analog converters at the input and output, respectively, of the processor).

Referring to FIG. 8, the video image signal, digitalized to 6-bits, for example, is input to an input latch 80 as a series of digital words, each corresponding to a pixel. The input digital video data is updated in the input latch at a rate determined by a clock signal from a clock 82 which runs at the pixel rate. From the input latch, the data is transferred to a current pixel latch 84. From current pixel latch 84, the data is transferred to a first delay 86 having a delay of 256 pixels corresponding to one horizontal scan line of the video display (for a 256×256 display). Data leaving delay 86 is transferred to another pixel latch 88 and then to a second delay 90, also having a one line delay of 256 pixels. The output data from delay 90 may be transferred to another pixel latch 92. Data is clocked through the delays 86 and 90 at the pixel rate, and, accordingly, the outputs of pixel latches 84, 88, and 92 represent, respectively, the current pixel, the pixel directly above the current pixel in the preceding scan line, and the pixel directly above that in the second preceding scan line.

Delays 86 and 90 may comprise, for example, random access memories (RAM's) which are addressed by an address counter 94 via an address latch 96 which are driven by the clock 82. At the beginning of each horizontal scan line, a line start pulse defining the beginning of the scan line is input to a horizontal reset circuit 98 which resets the address counter. For each incoming pixel, the RAM's may be cycled through a read, modify, write sequence in which the old data in a specific location is read and latched, and new data either from the incoming video or the preceding line memory is written in its place. A read and write enable signal for the memories may be derived from a read/write enable circuit 100. As a result of this arrangement, pixel latches 84, 88, and 92 output data at the pixel rate corresponding to the values of consecutive pixels in three adjacent rows, i.e., on three adjacent scan lines.

As shown in the figure, the outputs from pixel latches 84, 88 and 92 are also supplied to shift registers 104, 106, and 108, respectively. Each shift register may have a length of eight pixels and a width of 6-bits, and may comprise, for example, six 8-bit shift registers operated in parallel. The shift registers are clocked at the pixel rate so that data is shifted through each successive stage of the registers. Each register constitutes a delay of up to eight pixels in length, and data corresponding to eight consecutive pixels along a scan line is simultaneously available at the output stages of each register. As shown in FIG. 8, an output is taken from the fourth stage of shift register 104 (labeled U), outputs are taken from the first, third, fourth, fifth and seventh stages of shift register 106 (labeled, respectively, Q, R, S, T, and W) and outputs are taken from the first and seventh stages of shift register 108, labeled P and V respectively. Since shift register 104 is driven from the current pixel latch 84, output U represents the value of the pixel on the current scan line which occurred four pixel intervals earlier than the current pixel. Similarly, the outputs of shift register 106 represent the values of pixels on the previous scan line which occurred 1, 3, 4, 5 and 7 pixels earlier than the pixel corresponding to the current pixel, and the outputs of shift register 108 represent the values of the pixels which occurred on the second previous scan line 1 and 7 pixels earlier than the pixel corresponding to the current pixel. These delayed pixel values, all of which are simultaneously available, are indicated in FIG. 9 for three successive scan lines. By comparing FIG. 9 to the mask of FIG. 5A, it can be seen that the shift register outputs correspond to pixel values which occupy the same relative positions as the elements of the mask. Accordingly, by combining the pixel values in the manner previously described, a result is obtained which corresponds to the value of the central pixel of the transformed image.

As indicated in FIG. 5A, and as previously described, the coefficients of the elements of the mask of FIG. 5A which are used are either +1 or −1. Therefore, the resultant value of the central pixel may be obtained by adding one values of pixels T, S, R, and U, and subtracting the values of pixels P, Q, V, and W. This may be easily accomplished, as indicated in FIG. 8, by adding outputs P, Q, V and W in a first adder 112 and inverting the result in an inverter 114 to provide the negative of the sum. The negative of the sum may be connected either directly to another adder 118, or first latched in a latch 116 (shown in phantom lines). Similarly, outputs T, S, R and U may be added together in adder 120 and connected either directly to a second input of adder 118, or first latched in another latch 122. The output of adder 118 is the resultant pixel value, which may be latched in a latch 124. The output of the latch may be applied to a PROM 126 which scales the value (as will be described) and adds a composite sync signal. The output of the PROM may be supplied to a signal level driver 128 for output from the processor. Latches 116 and 122 may be employed to compensate for different signal path delays, and are useful for high speed operation where the delays become significant with respect to the clock period.

From the foregoing, it can be seen that the processor provides transformed pixel values which are delayed by two scan lines and four pixels (five pixels if latches 116 and 122 are used) from the current pixel. For any given scan line, the pixels are delayed four pixel intervals relative to the composite sync. Accordingly, the composite sync may be supplied to a delay circuit 130, the output of which is added in PROM 126 to the resultant pixel values from latch 124 in order to reassemble the scan lines. The output of latch 124 constitutes an 8-bit word, and the composite sync may be supplied to the PROM in the most significant bit (MSB) position as a ninth bit. The PROM preferably has a transfer characteristic as shown in FIG. 10. The nine bits into the PROM correspond to 512 input values. Since the most significant bit is the composite sync, when the composite sync is present (between input levels 0 and 255) the output of the PROM corresponds to sync bottom of the video signal. For an input value of 256 (corresponding to the minimum pixel value) the PROM provides an output corresponding to the black signal level. For input values between 256 and 384, the PROM output is a linear function of input and corresponds to different grey levels. For input values between 384 and 512, the output of the PROM corresponds to the full white or full brightness of the video signal. This transfer characteristic serves to emphasize lower pixel values to provide a brighter overall image.

While preferred embodiments of the invention have been shown and described, it will be appreciated by those skilled in the art that changes may be made in these embodiments without departing from the principles and the spirit of the invention, the scope of which is defined in the appended claims.

What is claimed is:

1. A method of processing ultrasound image data to reduce acoustic speckle noise and enhance selected portions of the image, the image being formed from a plurality of pixels arranged in a spatial array and said data representing an intensity level in each pixel, the method comprising weighting the data representative of preselected ones of less than all of the pixels of an asymmetric portion of said spatial array with predetermined coefficient values, said preselected pixels and said coefficient values being selected to enhance the leading edges of spots in the image which have a size greater than a predetermined size corresponding to an average size of acoustic speckle and which have a predetermined location in the asymmetric portion; combining the weighted data to produce a transformed intensity value; repeating said weighting and said combining for a plurality of different asymmetric portions of the spatial array; forming another array of pixels by using each transformed intensity value as a value of a pixel of said other array which corresponds to a central pixel of the corresponding asymmetric portion; and displaying said other array as an image.

2. The method of claim 1, wherein said weighting comprises multiplying the intensity values of pixels in a lower central area of said asymmetric portion by positive integers and multiplying the intensity values of pixels in opposite upper corners of said asymmetric portion by negative integers, and wherein said combining comprises summing the results of said multiplications.

3. The method of claim 2, wherein said integers all have an absolute value of 1.

4. The method of claim 2, wherein the predetermined size of said spots is at least equivalent to the size of an array of 3×2 pixels, and said predetermined location comprises said lower central area.

5. The method of claim 1, wherein said preselected pixels and said predetermined coefficients are selected such that the transformed intensity value is a function of a bi-angular gradient of intensity values of a spot in a lower central area of the asymmetric portion.

6. The method of claim 5, wherein said asymmetric portion comprises a 3×7 array.

7. The method of claim 1, wherein said repeating comprises selecting the asymmetric portions such that successive portions overlap and such that the entire spatial array of pixels is covered.

8. The method of claim 1, wherein said image is an ultrasonic image of a portion of a human body, and said image data is in polar format.

9. A method of processing ultrasound image data to reduce acoustic speckle noise and enhance selected portions of the image, the image being formed from a plurality of pixels arranged in a spatial array and said data representing an intensity level in each pixel, the method comprising applying to the data representative of preselected pixels comprising less than all of the pixels of an asymmetric portion of the spatial array a gradient operator, the operator having a plurality of elements, each element corresponding to a different pixel of the asymmetric portion and preselected ones of the elements of the operator corresponding to said preselected pixels being assigned coefficient values, said applying comprising forming a weighted sum of the product of the coefficient values and intensity values of corresponding pixels of the asymmetric portion to produce a new intensity value representative of an intensity gradient in a predetermined area of the asymmetric portion; the preselected pixels and the coefficient values being selected to enhance the intensity of spots in the image which are greater than a predetermined size and to minimize the intensity of other spots which are less than the predetermined size; repeating said applying for a plurality of asymmetric portions; forming another spatial array of pixels using the new intensity values; and displaying said other array as an image.

10. The method of claim 9, wherein said gradient operator comprises a balanced operator formed to produce a biangular gradient value that is maximized for spots of a predetermined size located in said predetermined area of the asymmetric portion.

11. The method of claim 10, wherein said gradient operator is formed such that the new intensity values enhance the edges of said spots.

12. The method of claim 9, wherein said asymmetric portion comprises a 3×7 array of pixels and said gradient operator comprises a 3×7 mask, and said preselected elements comprise a first group of elements located in a lower central portion of the mask, and second and third groups of elements located in opposite upper corners of the mask.

13. The method of claim 12, wherein said first group of elements has positive coefficient values and said second and third groups have negative coefficient values.

14. The method of claim 9, wherein said repeating comprises successively applying the gradient operator to a plurality of overlapping asymmetric portions until the entire image is covered.

15. Apparatus for processing ultrasound image data to reduce acoustic speckle noise and enhance selected portions of the image, the image being formed by pluralities of pixels arranged in a plurality of lines and the image data representing the intensity level in each of the pixels, the apparatus comprising means for receiving successive data corresponding to successive pixels; means for applying to the data an asymmetrical operator for enhancing spots in the image which correspond to specular targets and for eliminating from the image spots which correspond to acoustic speckle, the applying means comprising first delay means connected to the receiving means for delaying said data by an interval corresponding to one line; second delay means for delaying the data from the first delay means by another interval corresponding to one line; third delay means connected to the receiving means for delaying the data by first predetermined pixel intervals to produce a first set of delayed pixel data; fourth delay means for delaying the data from the first delay means by second predetermined pixel intervals to produce a second set of delayed pixel data; fifth delay means for delaying the data from the second delay means by third predetermined pixel intervals to produce a third set of delayed pixel data; the third, fourth and fifth delay means being selected such that the first, second and third sets of delayed pixel data represent less than all of the pixels of an asymmetrical array of pixels which corresponds to said asymmetrical operator; means for combining successive first, second, and third sets of delayed pixel data to produce corresponding successive new intensity values; and means connected to the combining means for forming a new line of pixels from said new intensity values.

16. The apparatus of claim 15, wherein said first set of delayed pixel data comprises data corresponding to a pixel on a current line which is delayed by four pixel intervals, said second set of delayed pixel data comprises data corresponding to pixels on a previous line delayed by one, three, four, five and seven pixel intervals, and said third set of delayed pixel data comprises data corresponding to pixels on a second previous line delayed by one and seven pixel intervals.

17. The apparatus of claim 16, wherein said combining means comprises means for summing the data corresponding to the pixel on the current line and the data corresponding to the pixel on the previous line delayed by four pixel intervals to produce a result, and means for subtracting from such result the sum of the remaining data of said second and third sets to produce said new intensity value.

18. The method of claim 15, further comprising scaling said new intensity values to a predetermined range of grey level intensity values.

19. The apparatus of claim 15, further comprising means for forming a plurality of said new lines of pixels to form a processed image, and means for displaying said processed image on a video display.

20. The apparatus of claim 15, wherein said first and second delay means each comprise random access memories, and said third, fourth and fifth delay means each comprise shift registers.

21. The apparatus of claim 15, wherein said first, second and third sets of delayed pixel data are selected such that the new intensity value produced by the combining means is maximized at the edges of a spot on said image which is larger than a predetermined size.

22. The apparatus of claim 21, wherein said sets of delayed pixel data are selected such that the new intensity value corresponds to a biangular gradient of intensity values in a predetermined area of the image.

* * * * *